US012313251B2

(12) United States Patent
Zhuo

(10) Patent No.: US 12,313,251 B2
(45) Date of Patent: May 27, 2025

(54) SOLDER-FREE LINEAR LIGHT

(71) Applicant: Dafeng Zhuo, Guangdong (CN)

(72) Inventor: Dafeng Zhuo, Guangdong (CN)

( * ) Notice: Subject to any disclaimer, the term of this patent is extended or adjusted under 35 U.S.C. 154(b) by 0 days.

(21) Appl. No.: 18/826,801

(22) Filed: Sep. 6, 2024

(65) Prior Publication Data

US 2025/0109848 A1 Apr. 3, 2025

(30) Foreign Application Priority Data

Sep. 28, 2023 (CN) ......................... 202322651193.4

(51) Int. Cl.
*F21V 23/06* (2006.01)
*F21S 4/28* (2016.01)

(52) U.S. Cl.
CPC ................ *F21V 23/06* (2013.01); *F21S 4/28* (2016.01)

(58) Field of Classification Search
CPC ....................................................... F21V 23/06
See application file for complete search history.

(56) References Cited

FOREIGN PATENT DOCUMENTS

DE 102011008898 A1 * 7/2012 .............. F21S 2/005
EP 3502542 A1 * 6/2019 ............. F21K 9/238

OTHER PUBLICATIONS

Innovation Q+ ip.com NPL Search (Year: 2024).*

* cited by examiner

*Primary Examiner* — Anabel Ton

(57) ABSTRACT

A solder-free linear light includes a conductive connector. The conductive connector includes a control main board configured to electrically connect with an input wire; a conductive spring piece group connected to a main control board; and a linear light main body. The conductive connector is detachably connected to the linear light main body, the linear light main body comprising a conductive guide rail and a light-emitting element electrically connected to the linear light main body. when the conductive connector is connected to the linear light main body, the conductive spring piece group is connected to the conductive guide rail.

19 Claims, 7 Drawing Sheets

SOLDER-FREE LINEAR LIGHT

CROSS-REFERENCE TO RELATED APPLICATIONS

The application claims priority of Chinese patent application CN202322651193.4, filed on Sep. 28, 2023, which is incorporated herein by reference in its entirety.

TECHNICAL FIELD

The present invention relates to the field of linear lights, in particular to a solder-free linear light.

BACKGROUND

A linear light is a line-shaped fixture, usually consisting of LED light beads. It can be used for lighting and decoration and is commonly found indoors and outdoors in buildings, roads, billboards, cars, etc. The linear light is soft, bendable and cuttable, making it widely used in different scenarios; a wide variety of visual effects can be created by controlling the strip's brightness, color and light patterns.

Currently, strip lights for cabinets on the market are mostly designed with leads soldered in an integrated structure. When the lamps need to be replaced, the entire light must be removed, which is not only time-consuming and laborious but also prone to damage the cabinet. Moreover, since the overall closet is custom-made, the strip lights in the market can only have their lengths customized by the manufacturer, which is extremely inconvenient for customers.

SUMMARY

In order to overcome the shortcomings of the prior art, the present disclosure provides a solder-free linear light, which not only realizes the convenience of disassembly and assembly, but also enables the customer to cut the length by himself according to his own needs to achieve customized freedom and improve the user experience.

The technical solution adopted by the present disclosure to solve the technical problem is as follows.

A solder-free linear light includes a conductive connector. The conductive connector includes:

- a control main board configured to electrically connect with an input wire;
- a conductive spring piece group connected to a main control board; and
- a linear light main body,
- wherein the conductive connector is detachably connected to the linear light main body,
- the linear light main body includes a conductive guide rail and a light-emitting element electrically connected to the linear light main body;
- wherein when the conductive connector is connected to the linear light main body, the conductive spring piece group is connected to the conductive guide rail.

As an improvement of the present disclosure, the control main board is provided with at least two spring piece solder holes, the conductive spring piece group includes at least two conductive spring pieces, the conductive spring piece is provided with a clamping member, and the conductive spring piece is fixedly connected to a lower end of the control main board by the clamping member.

As an improvement of the present disclosure, the the control main board includes a first spring piece solder hole and a second spring piece solder hole, the conductive spring piece group includes a first conductive spring piece and a second conductive spring piece, the first conductive spring piece is provided with a first clamping member, the first clamping member includes two first spring piece folded edges oppositely arranged, one of the first spring piece folded edges is clamped and inserted into the first spring piece solder hole, the other one of the first spring piece folded edges is connected to an outer side wall of the control main board adjacent to the first spring piece solder hole, the second conductive spring piece is provided with a second clamping member, the second clamping member includes two second spring piece folded edges, one of the second spring piece folded edges is clamped and inserted into the second spring piece solder hole, and the other one of the second spring piece folded edge is connected to an outer side wall of the control main board adjacent to the second spring piece solder hole.

As an improvement of the present disclosure, the conductive connector includes an upper end cover and a lower end cover, two spring piece openings are provided on a lower end surface of the lower end cover, and the two conductive spring pieces respectively passed through the spring piece openings and connected to the conductive guide rail.

As an improvement of the present disclosure, the upper end cover is connected to the lower end cover to form an installation cavity, the control main board is arranged in the installation cavity, the control main board is provided with a solder pad, the conductive connector is provided with an outlet hole, one end of an input wire is soldered to the solder pad, and the other end of the input wire passes through the outlet hole and is positioned on an outer side of the conductive connector.

As an improvement of the present disclosure, the upper end cover is provided with a clasp front hole and a clasp rear hole on two opposite sides, a rear clasp and a front clasp are respectively arranged on two opposite side boards of the lower end cover, the rear clasp and the front clasp are respectively fastened in the front clasp hole and the rear clasp hole, and an expanded edge is respectively arranged on two sides of the lower end cover.

As an improvement of the present disclosure, the linear light main body further includes a light-emitting cover, the light-emitting element is a LED light-emitting linear light, the LED light-emitting linear light is arranged on an upper end surface of the conductive guide rail, the light-emitting cover is installed at an upper end of the linear light main body, and light emitted by the light-emitting element is able to pass through the light-emitting cover.

As an improvement of the present disclosure, an upper end surface of the light-emitting cover adjacent to the light-emitting element is provided with a light-emitting cover arc surface.

As an improvement of the present disclosure, a side wall of the linear light main body is symmetrically provided with an installation groove, the linear light main body is provided with a number of installation card holders, the installation card holder is engaged with the installation groove such that the installation card holder is installed on an outer side wall of the linear light main body.

As an improvement of the present disclosure, the installation groove includes a first installation groove and a second installation groove, the installation card holder is provided with a first clamping arm and a second clamping arm, the first clamping arm is clamped in the first installation groove, and the second clamping arm is pressed firmly against the second installation groove.

As an improvement of the present disclosure, the number of the installation grooves is two, and the number of installation card holders is two.

As an improvement of the present disclosure, a lower end of the linear light main body is symmetrically provided with an installation gap, the linear light main body is provided with a number of the installation card holders, and the installation card holder is clamped in the installation gap.

As an improvement of the present disclosure, two outer side walls opposite in a width direction of the linear light main body are smooth side walls.

As an improvement of the present disclosure, the conductive connector is provided with a switch sensing device, and the switch sensing device is a hand-sweeping sensing switch, a PIR human body sensing switch or a touch sensing switch.

As an improvement of the present disclosure, an upper end of the conductive connector is provided with a placement groove, two probe holes are disposed at a bottom of an interior of the placement groove, an interior of the placement groove is provided with an optical filter, a lower end surface of the optical filter is provided with a light guide pillar, the light guide pillars are provided with two, and the light guide pillar is arranged in an interior of the probe hole.

As an improvement of the present disclosure, a lower end surface of the conductive connector is provided with an isolation edge, and the isolation edge is arranged between the two probe holes.

As an improvement of the present disclosure, the control main board is provided with an isolation hole, the isolation hole is arranged on a right side of the spring piece solder hole, and at least one sensing probe is provided on an upper end surface of the control main board.

As an improvement of the present disclosure, the at least one sensing probe is provided with two, the two sensing probes are arranged on two sides of the isolation hole, and the isolation hole and the isolation edge match each other.

As an improvement of the present disclosure, one end of the linear light main body is connected to the conductive connector, and the other end of the linear light main body away from the conductive connector is connected to an end cover.

As an improvement of the present disclosure, the conductive connector is clamped and fixed to the linear light main body by an interference fit.

Beneficial effects: The present invention is provided with a solder-free linear light, the solder-free linear light includes a conductive connector having a control main board and a conductive spring piece group connected to the control main board, the control main board is configured to electrically connect with an input wire. The solder-free linear light further includes a linear light main body, the conductive connector is detachably connected to the linear light main body. The linear light main body includes a conductive guide rail and a light-emitting element electrically connected to the linear light main body. When the conductive connector is connected to the linear light main body, the conductive spring piece group is connected to the conductive guide rail. Through the above structure, by connecting the conductive connector to the linear light main body, the conductive spring piece group is connected to the conductive guide rail so as to energize the light-emitting element with the input wire and thereby emit light. Compared to existing products, the linear light can be arbitrarily cut. Through the connection between the conductive connector and the linear light main body, energization can be realized, eliminating the tedious operation of solder again. The structure is simple, easy to install and greatly improves the user's experience.

BRIEF DESCRIPTION OF THE DRAWINGS

In order to explain the technical solutions of the embodiments of the present disclosure more clearly, the following will briefly introduce the accompanying drawings used in the embodiments. The drawings in the following description are only some embodiments of the present disclosure. Those of ordinary skill in the art can obtain other drawings based on these drawings without creative work.

The present disclosure is further described below in detail in combination with the accompanying drawings and embodiments

DETAILED DESCRIPTION OF THE EMBODIMENTS

Figure 1:
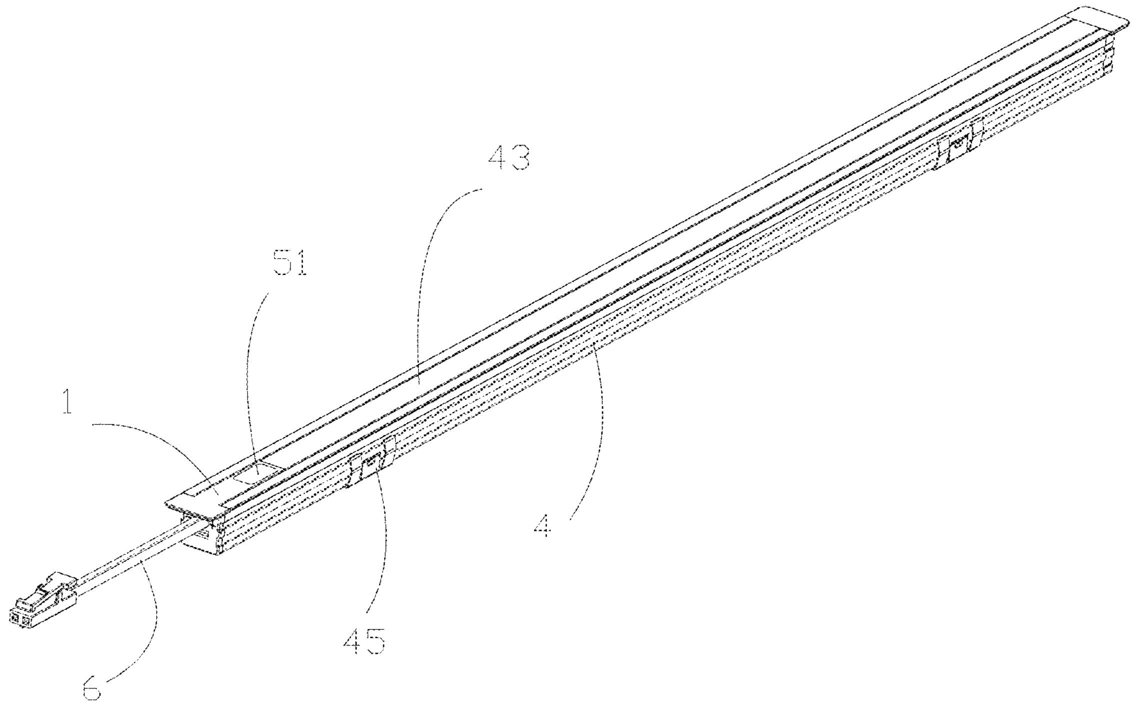
FIG. 1 is a schematic diagram of an overall structure of a linear light of the present invention.
Figure 2:
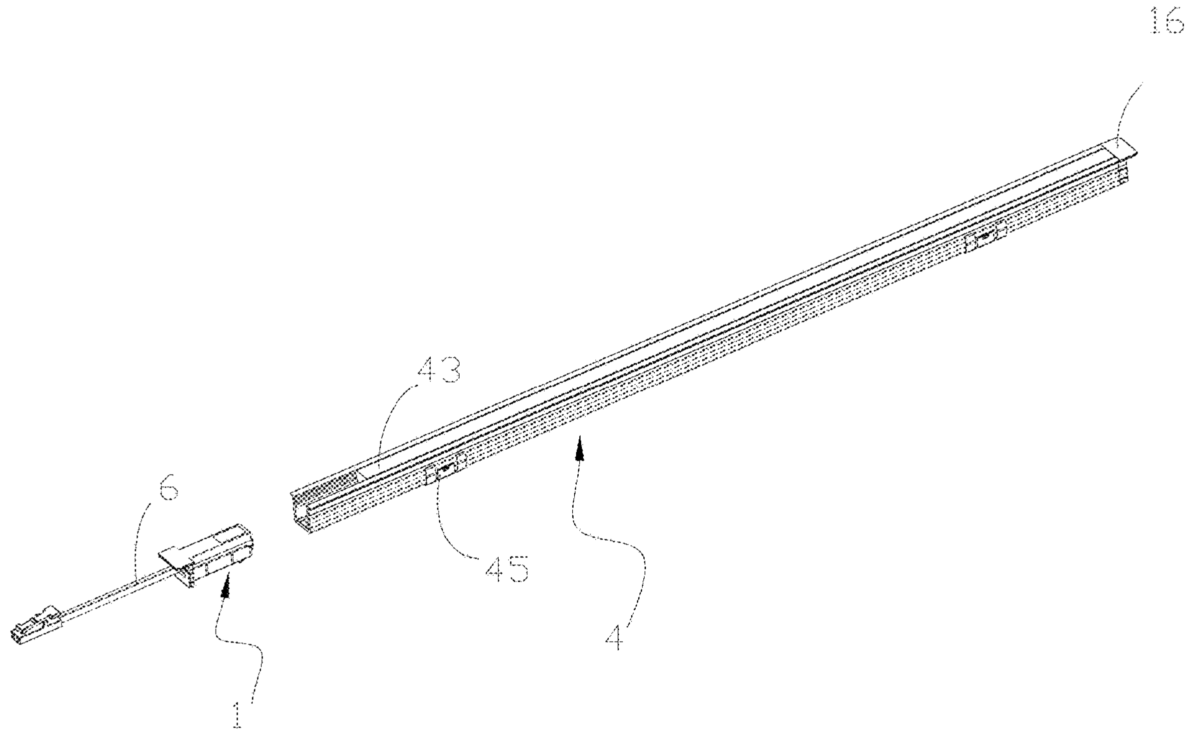
FIG. 2 is a schematic diagram of a separation of a conductive connector and a linear light main body of the linear light of the present invention.
Figure 3:
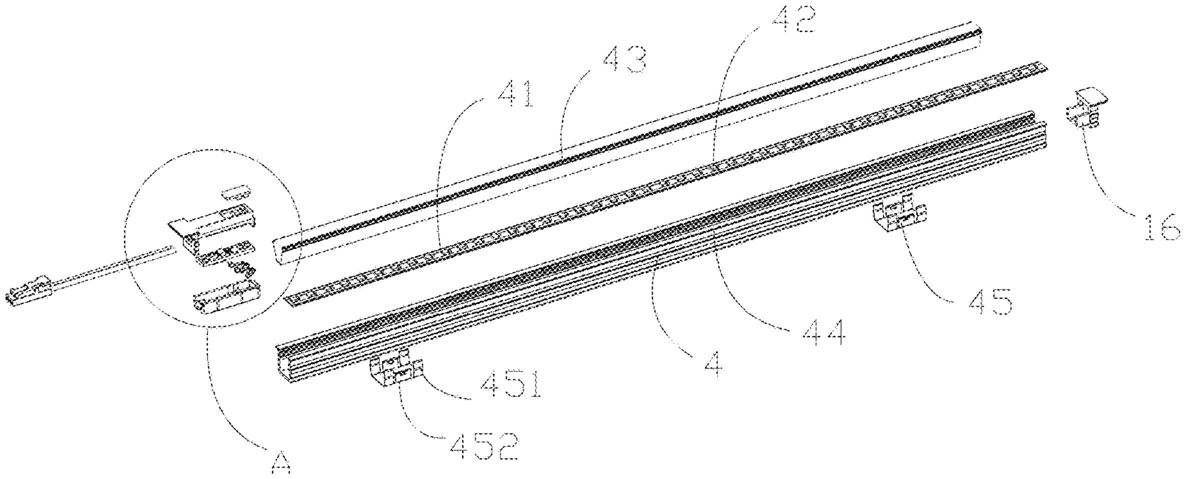
FIG. 3 is an exploded diagram of the linear light of the present invention.
Figure 4:
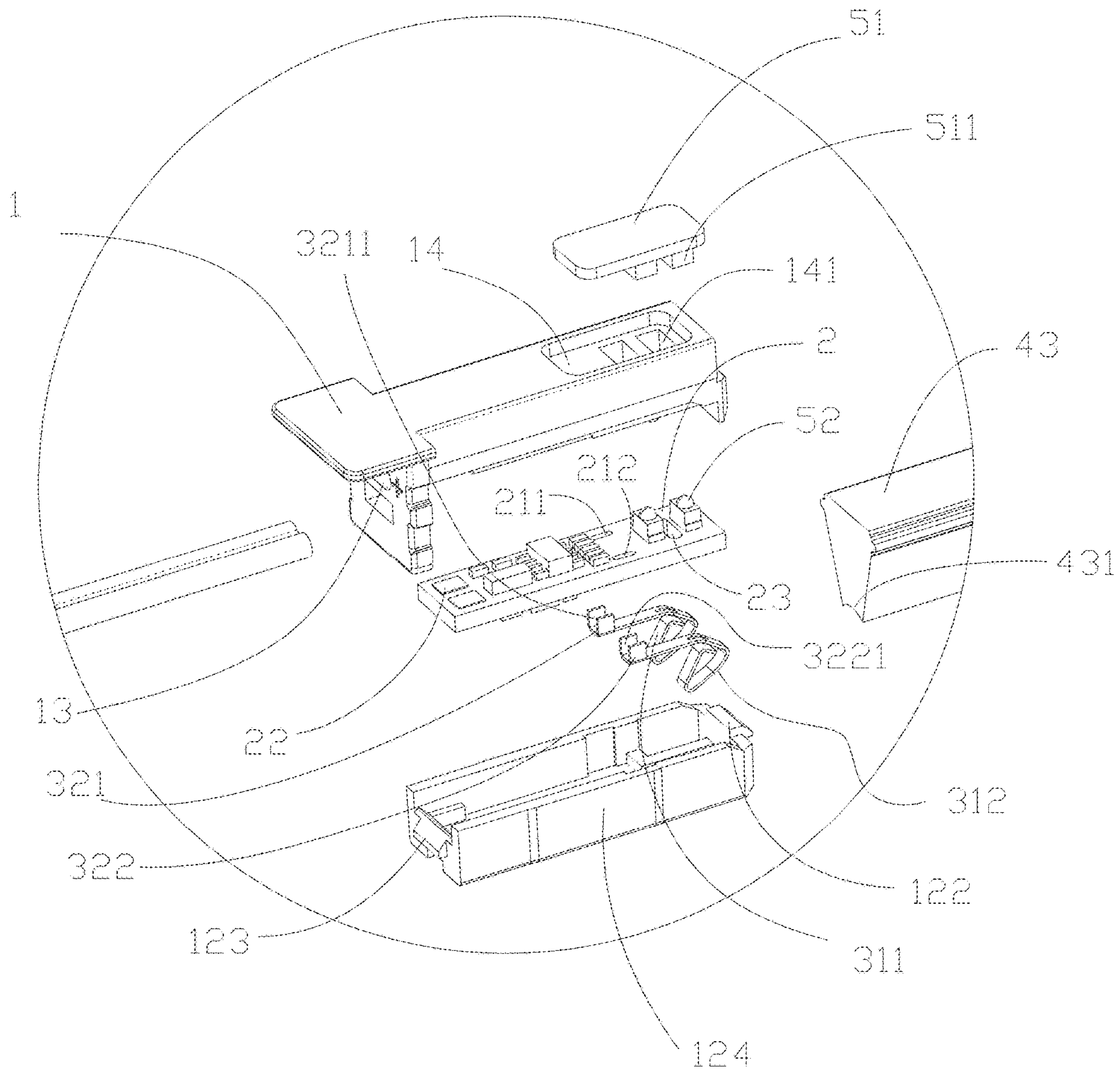
FIG. 4 is an enlarged diagram of FIG. 3 at A.
Figure 5:
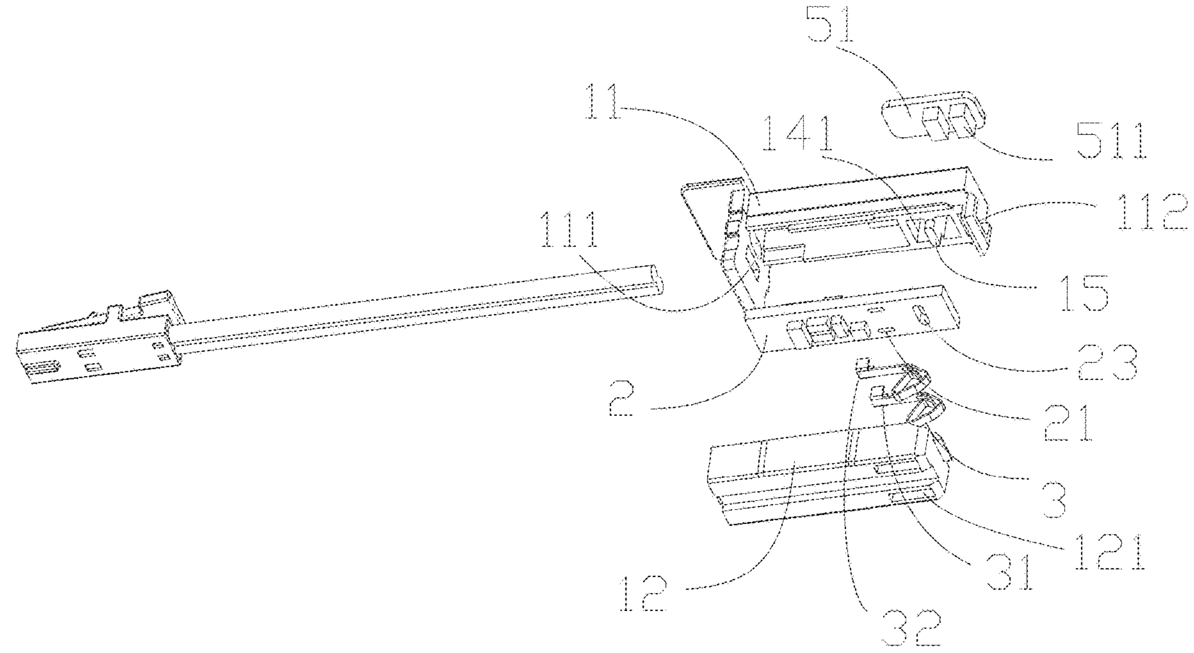
FIG. 5 is an exploded diagram of the conductive connector of the linear light of the present invention.
Figure 6:
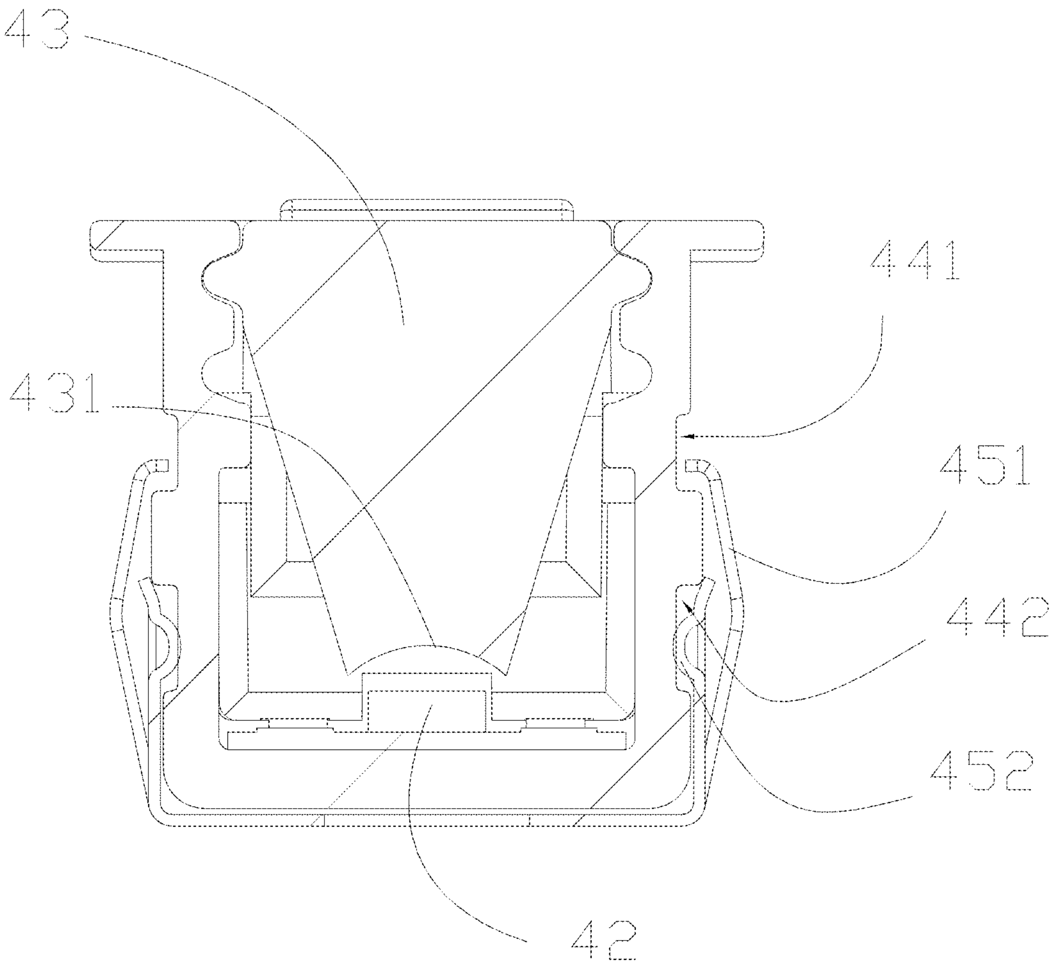
FIG. 6 is a sectional diagram cut along an installation card holder of the linear light of the present invention.

Referring to FIG. 1 to FIG. 6, the present invention provides a solder-free linear light, the solder-free linear light includes a conductive connector 1 having a control main board 2 and a conductive spring piece group 3 connected to the control main board 2, the control main board 2 is configured to electrically connect with an input wire 6. The solder-free linear light further includes a linear light main body 4, the conductive connector 1 is detachably connected to the linear light main body 4. The linear light main body 4 includes a conductive guide rail 41 and a light-emitting element 42 electrically connected to the linear light main body 4. When the conductive connector 1 is connected to the linear light main body 4, the conductive spring piece group 3 is connected to the conductive guide rail 41. Through the above structure, by connecting the conductive connector 1 to the linear light main body 4, the conductive spring piece group 3 is connected to the conductive guide rail 41 so as to energize the light-emitting element 42 with the input wire 6 and thereby emit light. Compared to existing products, the linear light can be arbitrarily cut. Through the connection between the conductive connector 1 and the linear light main body 4, energization can be realized, eliminating the tedious operation of solder again. The structure is simple, easy to install and greatly improves the user's experience.

In this embodiment, the control main board 2 is provided with at least two spring piece solder holes 21, the conductive spring piece group 3 includes at least two conductive spring pieces 31, the conductive spring piece 31 is provided with a clamping member 32, and the conductive spring piece 31 is fixedly connected to a lower end of the control main board 2 by the clamping member 32. Through the above structure, since two conductive spring pieces 31 are respectively clamped in the spring piece solder holes 21 by the clamping members 32, effectively realizing that the conductive spring pieces 31 is firmly installed on the lower end of the control main board 2, preventing the conductive connector 1 from shifting the conductive spring piece 31 when inserted into the linear light main body 4, and ensuring that the conductive spring piece 31 is accurately and steadily connected to the conductive guide rail 41 in the linear light main body 4 to conduct electricity.

Furthermore, the the control main board 2 includes a first spring piece solder hole 211 and a second spring piece solder hole 212, the conductive spring piece group 3 includes a first conductive spring piece 311 and a second conductive spring piece 312, the first conductive spring piece 311 is provided with a first clamping member 321, the first clamping member includes two first spring piece folded edges 3211 oppositely arranged, one of the first spring piece folded edges 3211 is clamped and inserted into the first spring piece solder hole 211, the other one of the first spring piece folded edges 3211 is connected to an outer side wall of the control main board 2 adjacent to the first spring piece solder hole 211, the second conductive spring piece 312 is provided with a second clamping member 322, the second clamping member 322 includes two second spring piece folded edges 3221, one of the second spring piece folded edges 3221 is clamped and inserted into the second spring piece solder hole 212, and the other one of the second spring piece folded edges 3221 is connected to an outer side wall of the control main board 2 adjacent to the second spring piece solder hole 212. Through the above structure, the fixed installation of the conductive spring piece 31 is effectively achieved. Moreover, the structure is simple, ensuring the stability of the installation of the conductive spring piece 31 and the control main board 2.

In this embodiment, the conductive connector includes an upper end cover 11 and a lower end cover 12, two spring piece openings 121 are provided on a lower end surface of the lower end cover 12, and the two conductive spring pieces 31 respectively passed through the spring piece openings 121 and connected to the conductive guide rail 41. Through the above structure, since the lower end surface is provided with the spring piece openings 121, the two conductive spring pieces 31 can pass through the spring piece openings 121 and be exposed at the lower end of the conductive connector 1. When the conductive connector 1 is inserted and connected to the linear light main body 4, the exposed conductive spring pieces 31 can come into contact with the conductive guide rail 41, thereby realizing that the light-emitting element 42 is energized and emits light.

In this embodiment, the upper end cover 11 is connected to the lower end cover 12 to form an installation cavity, the control main board 2 is arranged in the installation cavity, the control main board 2 is provided with a solder pad 22, the conductive connector 1 is provided with an outlet hole 13, one end of an input wire is soldered to the solder pad 22, and the other end of the input wire passes through the outlet hole 13 and is positioned on an outer side of the conductive connector 1. Through the above structure, the solder pad 22 facilitates the solder of the input wire and ensures that the input wire 6 can be firmly soldered onto the control main board 2. This prevents the input wire from shifting and loosening, thereby ensuring stable power input.

In this embodiment, the upper end cover 11 is provided with a clasp front hole 111 and a clasp rear hole 112 on two opposite sides, a rear clasp 122 and a front clasp 123 are respectively arranged on two opposite side boards of the lower end cover 12, the rear clasp 122 and the front clasp 123 are respectively fastened in the front clasp hole 111 and the rear clasp hole 112, and an expanded edge 124 is respectively arranged on two sides of the lower end cover 12. Through the above structure, the upper end cover 11 and the lower end cover 12 are effectively installed in conjunction with each other. It is convenient for the user to disassemble the conductive connector 1. The setting of the expanded edge 124 facilitates the subsequent installation of the conductive connector 1 inside the linear light main body 4.

In this embodiment, the linear light main body 4 further includes a light-emitting cover 43, the light-emitting element 42 is a LED light-emitting linear light, the LED light-emitting linear light is arranged on an upper end surface of the conductive guide rail 41, the light-emitting cover 43 is installed at an upper end of the linear light main body 4, so that light emitted by the light-emitting element 42 is able to pass through the light-emitting cover 43. Through the above structure, the LED light-emitting strip can provide more energy-efficient, environmentally friendly and brighter light. The light-emitting cover 43 installed on the upper end surface of the linear light main body 4 is a transparent and penetrable light-emitting cover 43. Moreover, the light-emitting cover 43 can also play a protective role for the light-emitting element 42.

Furthermore, an upper end surface of the light-emitting cover 43 adjacent to the light-emitting element 42 is provided with a light-emitting cover arc surface 431. Through the above structure, the setting of the light-emitting cover arc surface 431 on the light-emitting cover 43 can spread uniformly the light emitted by the LED light-emitting strip, enabling uniform lighting. Moreover, the operator can choose the installation angle of the light-emitting cover 43 according to the customer's needs to realize flat illumination and oblique illumination.

In this embodiment, a side wall of the linear light main body 4 is symmetrically provided with an installation groove 44, the linear light main body 4 is provided with a number of installation card holders 45, the installation card holder 45 is engaged with the installation groove 44 such that the installation card holder 45 is installed on an outer side wall of the linear light main body 4. Specifically, the installation groove includes a first installation groove 441 and a second installation groove 442, the installation card holder 45 is provided with a first clamping arm 451 and a second clamping arm 452, the first clamping arm 451 is clamped in the first installation groove 441, and the second clamping arm 452 is pressed firmly against the second installation groove 442. Furthermore, the number of the installation grooves 44 is two, and the number of installation card holders 45 is two. Through the above structure, by providing the installation groove 44 on both outer side walls of the linear light main body 4, it is made convenient for the installation card holder 45 and the installation groove 44 to have an engaging effect. The linear light with the installation card holder 45 is installed in the installation card groove inside the cabinet. The linear light is fixed to the wall surface by the installation card holder 45, thereby effectively realizing the installation of the linear light.

In anther embodiment, a lower end of the linear light main body 4 is symmetrically provided with an installation gap 46, the linear light main body 4 is provided with a number of the installation card holders 45, and the installation card holder 45 is clamped in the installation gap 46. In addition, two outer side walls opposite in a width direction of the linear light main body 4 are smooth side walls. Through the above structure, the installation gap 46 is provided by concave arrangement in the lower end surface of the linear light main body 4. The installation card holder 45 is skillfully fixed in the installation gap 46, effectively realizing the clamping and fixing of the installation card holder 45. This structure is not only ingeniously designed but also simple to operate.

Figure 7:
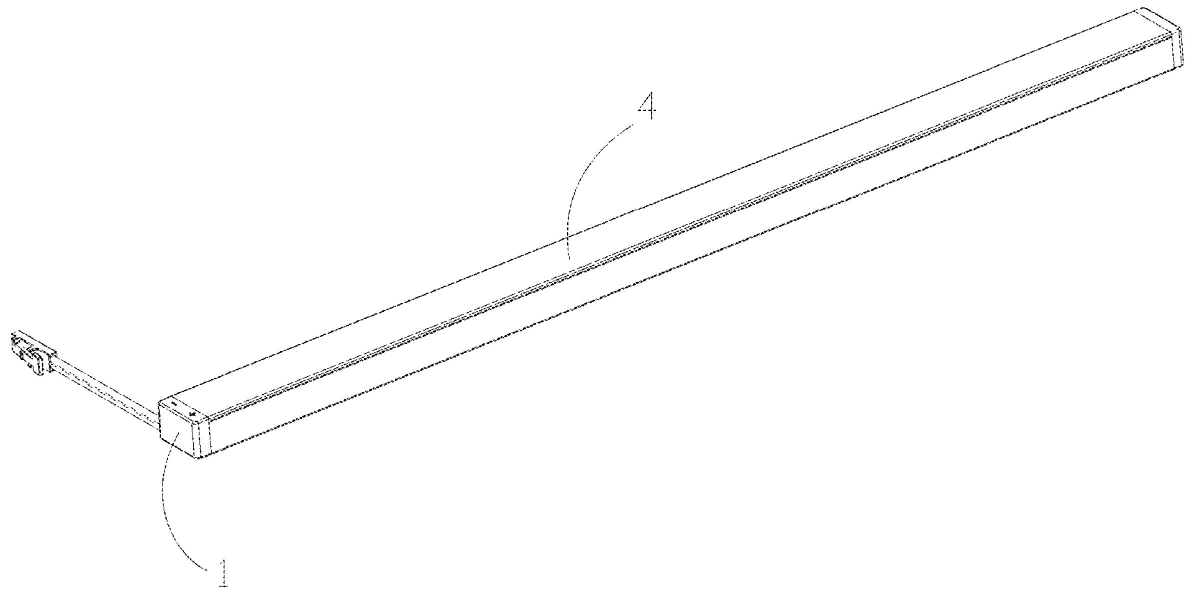
FIG. 7 is a schematic diagram of a structure in another embodiment of the linear light of the present invention.
Figure 8:
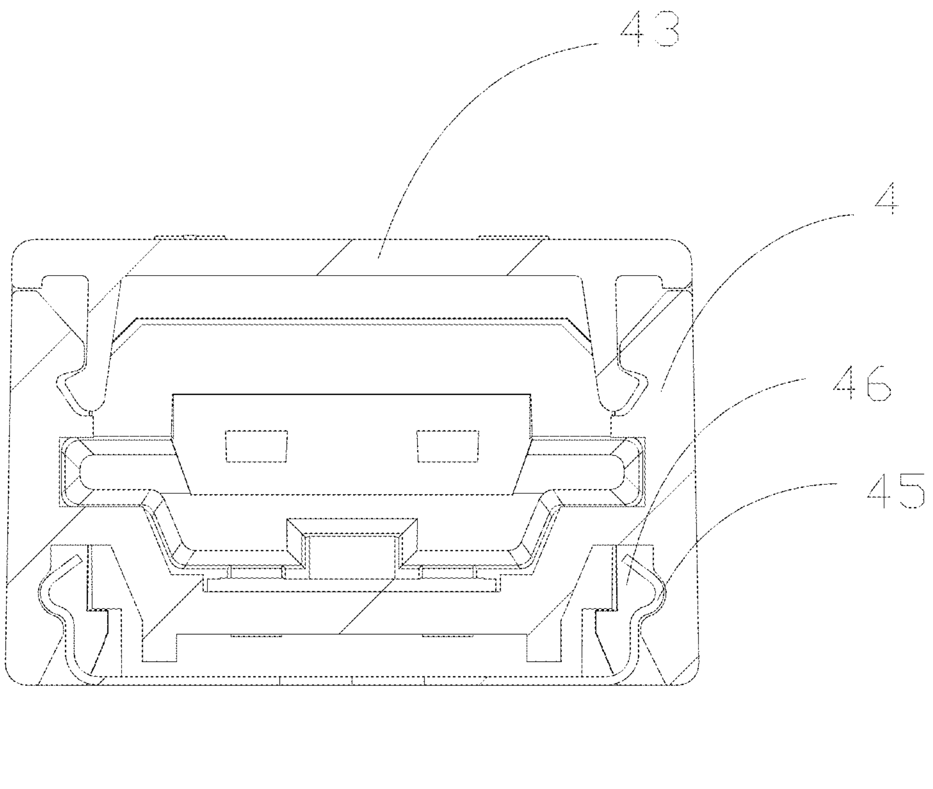
FIG. 8 is a sectional diagram cut along the installation card holder in another embodiment of the linear light of the present invention.

In some embodiments, referring to FIGS. 7 and 8, the conductive connector 1 is provided with a switch sensing device 5. The switch sensing device 5 includes, but is not limited to, a hand-sweeping sensing switch, a PIR human body sensing switch, or a touch sensing switch. Through the above structure, after the solder-free linear light installation is completed, users can turn on or off the linear light based on the specific switching mode of the conductive connector 1, and a switching method with better adaptability can be installed according to the actual product.

In this embodiment, the switch sensing device 5 is a hand-swept sensing switch, an upper end of the conductive connector 1 is provided with a placement groove 14, two probe holes 141 are disposed at a bottom of an interior of the placement groove 14, an interior of the placement groove 14 is provided with an optical filter 51, a lower end surface of the optical filter 51 is provided with a light guide pillar 511, the light guide pillars 511 are provided with two, and the light guide pillar 511 is arranged in an interior of the probe hole 141.

Furthermore, a lower end surface of the conductive connector 1 is provided with an isolation edge 15, and the isolation edge 15 is arranged between the two probe holes 141. The control main board 2 is provided with an isolation hole 23, the isolation hole 23 is arranged on a right side of the spring piece solder hole 21, and at least one sensing probe 52 is provided on an upper end surface of the control main board 2. The at least one sensing probe 52 is provided with two, the two sensing probes 52 are arranged on two sides of the isolation hole 23, and the isolation hole 23 and the isolation edge 15 match each other. Through the above structure, the sensing probe 52 and the probe hole 141 realize the hand-scanning function through the light guide pillar 511 of the optical filter 51, this structure can effectively avoid the problem of light interference, the disposed isolation hole 23 is convenient for the isolation edge 15 to be arranged in its inner part, and the setting of the sensing probe 52 can make the solder-free linear light realize the hand-scanning sensing function. When the linear light needs to be used, the user only needs to sweep his hand over the top of the optical filter 51 to complete the operation of turning on and off the light, and when the brightness of the linear light needs to be adjusted, the operator only needs to keep his hand on the lower end of the conductive connector 1 for a while to realize the adjustment of the brightness of the linear light.

In this embodiment, one end of the linear light main body 4 is connected to the conductive connector 1, and the other end of the linear light main body 4 away from the conductive connector 1 is connected to an end cover 16. Through the above structure, the solder-free linear light is installed with the end cover 16 on the other end of the linear light main body 4 after the cutting is completed, ensuring the integrity of the linear light, protecting the internal structure of the linear light main body 4, and also making the linear light more aesthetically pleasing.

In this embodiment, the conductive connector 1 is clamped and fixed to the linear light main body 4 by an interference fit. Through the above structure, since both sides of the lower end cover 12 of the conductive connector 1 is fixedly provided with the expanded edge 124, when the conductive connector 1 is inserted into the linear light main body 4, under the elastic extrusion of the expansion of the expanded edge 124, the conductive connector 1 and the linear light main body 4 are in interference fit to achieve clamping and tight fixation. It is easy and fast to install, easy to operate, and improves the efficiency of the user's installation and the user experience.

As described above, one or more embodiments are provided in conjunction with the detailed description, The specific implementation of the present disclosure is not confirmed to be limited to that the description is similar to or similar to the method, the structure and the like of the present disclosure, or a plurality of technical deductions or substitutions are made on the premise of the conception of the present disclosure to be regarded as the protection of the present disclosure.

What is claimed is:

1. A solder-free linear light comprising a conductive connector, the conductive connector comprising:

a control main board configured to electrically connect with an input wire;

a conductive spring piece group connected to a main control board; and a linear light main body, wherein the conductive connector is detachably connected to the linear light main body, the linear light main body comprising a conductive guide rail and a light-emitting element electrically connected to the linear light main body;

wherein when the conductive connector is connected to the linear light main body, the conductive spring piece group is connected to the conductive guide rail, wherein the control main board is provided with at least two spring piece solder holes, the conductive spring piece group comprises at least two conductive spring pieces, the conductive spring piece is provided with a clamping member, and the conductive spring piece is fixedly connected to a lower end of the control main board by the clamping member.

2. The solder-free linear light according to claim 1, wherein the the control main board comprises a first spring piece solder hole and a second spring piece solder hole, the conductive spring piece group comprises a first conductive spring piece and a second conductive spring piece, the first conductive spring piece is provided with a first clamping member, the first clamping member comprises two first spring piece folded edges oppositely arranged, one of the first spring piece folded edges is clamped and inserted into the first spring piece solder hole, the other one of the first spring piece folded edges is connected to an outer side wall of the control main board adjacent to the first spring piece solder hole, the second conductive spring piece is provided with a second clamping member, the second clamping member comprises two second spring piece folded edges, one of the second spring piece folded edges is clamped and inserted into the second spring piece solder hole, and the other one of the second spring piece folded edge is connected to an outer side wall of the control main board adjacent to the second spring piece solder hole.

3. The solder-free linear light according to claim 1, wherein the conductive connector comprises an upper end cover and a lower end cover, two spring piece openings are provided on a lower end surface of the lower end cover, and the two conductive spring pieces respectively passed through the spring piece openings and connected to the conductive guide rail.

4. The solder-free linear light according to claim 3, wherein the upper end cover is connected to the lower end cover to form an installation cavity, the control main board is arranged in the installation cavity, the control main board is provided with a solder pad, the conductive connector is provided with an outlet hole, one end of an input wire is soldered to the solder pad, and the other end of the input wire passes through the outlet hole and is positioned on an outer side of the conductive connector.

5. The solder-free linear light according to claim 3, wherein the upper end cover is provided with a clasp front hole and a clasp rear hole on two opposite sides, a rear clasp and a front clasp are respectively arranged on two opposite side boards of the lower end cover, the rear clasp and the front clasp are respectively fastened in the front clasp hole and the rear clasp hole, and an expanded edge is respectively arranged on two sides of the lower end cover.

6. The solder-free linear light according to claim 3, wherein the linear light main body further comprises a light-emitting cover, the light-emitting element is a LED light-emitting linear light, the LED light-emitting linear light is arranged on an upper end surface of the conductive guide rail, the light-emitting cover is installed at an upper end of the linear light main body, and light emitted by the light-emitting element is able to pass through the light-emitting cover.

7. The solder-free linear light according to claim 6, wherein an upper end surface of the light-emitting cover adjacent to the light-emitting element is provided with a light-emitting cover arc surface.

8. A solder-free linear light comprising a conductive connector, the conductive connector comprising:

a control main board configured to electrically connect with an input wire;

a conductive spring piece group connected to a main control board; and a linear light main body, wherein the conductive connector is detachably connected to the linear light main body, the linear light main body comprising a conductive guide rail and a light-emitting element electrically connected to the linear light main body;

wherein when the conductive connector is connected to the linear light main body, the conductive spring piece group is connected to the conductive guide rail, wherein a side wall of the linear light main body is symmetrically provided with an installation groove, the linear light main body is provided with a number of installation card holders, the installation card holder is engaged with the installation groove such that the installation card holder is installed on an outer side wall of the linear light main body.

9. The solder-free linear light according to claim 8, wherein the installation groove comprises a first installation groove and a second installation groove, the installation card holder is provided with a first clamping arm and a second clamping arm, the first clamping arm is clamped in the first installation groove, and the second clamping arm is pressed firmly against the second installation groove.

10. The solder-free linear light according to claim 8, wherein the number of the installation grooves is two, and the number of installation card holders is two.

11. A solder-free linear light comprising a conductive connector, the conductive connector comprising:

a control main board configured to electrically connect with an input wire;

a conductive spring piece group connected to a main control board; and a linear light main body, wherein the conductive connector is detachably connected to the linear light main body, the linear light main body comprising a conductive guide rail and a light-emitting element electrically connected to the linear light main body;

wherein when the conductive connector is connected to the linear light main body, the conductive spring piece group is connected to the conductive guide rail, wherein a lower end of the linear light main body is symmetrically provided with an installation gap, the linear light main body is provided with a number of the installation card holders, and the installation card holder is clamped in the installation gap.

12. The solder-free linear light according to claim 11, wherein two outer side walls opposite in a width direction of the linear light main body are smooth side walls.

13. A solder-free linear light comprising a conductive connector, the conductive connector comprising:

a control main board configured to electrically connect with an input wire;

a conductive spring piece group connected to a main control board; and a linear light main body, wherein the conductive connector is detachably connected to the linear light main body, the linear light main body comprising a conductive guide rail and a light-emitting element electrically connected to the linear light main body;

wherein when the conductive connector is connected to the linear light main body, the conductive spring piece group is connected to the conductive guide rail, wherein the conductive connector is provided with a switch sensing device, and the switch sensing device is a hand-sweeping sensing switch, a PIR human body sensing switch or a touch sensing switch.

14. A solder-free linear light comprising a conductive connector, the conductive connector comprising:

a control main board configured to electrically connect with an input wire;

a conductive spring piece group connected to a main control board; and a linear light main body, wherein the conductive connector is detachably connected to the linear light main body, the linear light main body comprising a conductive guide rail and a light-emitting element electrically connected to the linear light main body;

wherein when the conductive connector is connected to the linear light main body, the conductive spring piece group is connected to the conductive guide rail, wherein an upper end of the conductive connector is provided with a placement groove, two probe holes are disposed at a bottom of an interior of the placement groove, an interior of the placement groove is provided with an optical filter, a lower end surface of the optical filter is provided with a light guide pillar, the light guide pillars are provided with two, and the light guide pillar is arranged in an interior of the probe hole.

15. The solder-free linear light according to claim 14, wherein a lower end surface of the conductive connector is provided with an isolation edge, and the isolation edge is arranged between the two probe holes.

16. The solder-free linear light according to claim 14, wherein the control main board is provided with an isolation hole, the isolation hole is arranged on a right side of the spring piece solder hole, and at least one sensing probe is provided on an upper end surface of the control main board.

17. The solder-free linear light according to claim 16, wherein the at least one sensing probe is provided with two, the two sensing probes are arranged on two sides of the isolation hole, and the isolation hole and the isolation edge match each other.

18. The solder-free linear light according to claim 1, wherein one end of the linear light main body is connected to the conductive connector, and the other end of the linear light main body away from the conductive connector is connected to an end cover.

19. The solder-free linear light according to claim 1, wherein the conductive connector is clamped and fixed to the linear light main body by an interference fit.

* * * * *